(12) United States Patent
John

(10) Patent No.: US 9,300,604 B2
(45) Date of Patent: *Mar. 29, 2016

(54) MULTIPLE PREFIX CONNECTIONS WITH TRANSLATED VIRTUAL LOCAL AREA NETWORK

(71) Applicant: Futurewei Technologies, Inc., Plano, TX (US)

(72) Inventor: Kaippallimalil Mathew John, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,082

(22) Filed: Oct. 28, 2013

(65) Prior Publication Data

US 2014/0064285 A1 Mar. 6, 2014

Related U.S. Application Data

(63) Continuation of application No. 12/772,261, filed on May 3, 2010, now Pat. No. 8,599,860.

(60) Provisional application No. 61/178,107, filed on May 14, 2009.

(51) Int. Cl.
*H04L 12/931* (2013.01)
*H04L 12/46* (2006.01)
*H04L 12/28* (2006.01)
*H04L 29/12* (2006.01)
(Continued)

(52) U.S. Cl.
CPC ............ *H04L 49/70* (2013.01); *H04L 12/2874* (2013.01); *H04L 12/4604* (2013.01); *H04L 12/4641* (2013.01); *H04L 29/12584* (2013.01); *H04L 45/74* (2013.01); *H04L 61/2596* (2013.01); *H04L 45/66* (2013.01); *H04L 49/3081* (2013.01); *H04L 2012/5652* (2013.01)

(58) Field of Classification Search
CPC ............ H04L 12/4604; H04L 12/4641; H04L 2012/5652; H04L 49/3081
See application file for complete search history.

(56) References Cited

U.S. PATENT DOCUMENTS 5,968,126 A 10/1999 Ekstrom et al.
6,798,775 B1 * 9/2004 Bordonaro et al. ........... 370/392
(Continued)

OTHER PUBLICATIONS

Draves, R., et al., "Default Router Preferences and More-Specific Routes," RFC 4194, Nov. 2005, 15 pages.
(Continued)

*Primary Examiner* — Lonnie Sweet
(74) *Attorney, Agent, or Firm* — Conley Rose, P.C.; Grant Rodolph; William H. Dietrich

(57) ABSTRACT

A system comprising an access node (AN) coupled to a plurality of service providers (SPs) and a host and configured to forward a plurality of services between the SPs and the host using a plurality of first connections between the AN and the host and a plurality of second connections between the AN and the SPs, and a router gateway (RG) positioned between the host and the AN and coupled to the AN via an access line that comprises the first connections, wherein the AN translates a plurality of first identifiers for the first connections to a plurality of second identifiers for the second connections to route the services appropriately between the host and the SPs over the first connections and the corresponding second connections.

6 Claims, 4 Drawing Sheets

(51) Int. Cl.
*H04L 12/741* (2013.01)
*H04L 12/935* (2013.01)
*H04L 12/70* (2013.01)
*H04L 12/721* (2013.01)

(56) References Cited

U.S. PATENT DOCUMENTS

| | | | |
|---|---|---|---|
| 6,975,581 B1* | 12/2005 | Medina et al. | 370/401 |
| 7,606,232 B1 | 10/2009 | Ruben et al. | |
| 7,821,972 B1* | 10/2010 | Finn et al. | 370/256 |
| 8,599,860 B2* | 12/2013 | Kaippallimalil | 370/395.53 |
| 2003/0152075 A1* | 8/2003 | Hawthorne et al. | 370/389 |
| 2004/0172480 A1 | 9/2004 | Hirose et al. | |
| 2004/0255154 A1 | 12/2004 | Kwan et al. | |
| 2005/0165953 A1 | 7/2005 | Oba et al. | |
| 2007/0133780 A1 | 6/2007 | Berner et al. | |
| 2008/0046597 A1 | 2/2008 | Stademann et al. | |
| 2008/0240113 A1 | 10/2008 | Arad et al. | |
| 2009/0129386 A1 | 5/2009 | Rune | |
| 2009/0238172 A1 | 9/2009 | Tanizawa et al. | |
| 2010/0145760 A1* | 6/2010 | Cambre et al. | 705/9 |
| 2010/0274924 A1 | 10/2010 | Allan et al. | |

OTHER PUBLICATIONS

"Ethernet Active Line Access: Technical Requirements, Discussion Document," Publication Date: Sep. 23, 2008, 47 pages.

"Ethernet Active Line Access: Technical Requirements, Discussion Document," Publication Date: Mar. 3, 2009, 88 pages.

Ernst, T., et al., "Motivations and Scenarios for Using Multiple Interfaces and Global Addresses," draft-ietf-monami6- multihoming-motivation-scenario=03.txt, May 3, 2008, 21 pages.

Office Action dated Sep. 24, 2012, U.S. Appl. No. 12/772,261, filed May 3, 2010, 15 pages.

Office Action dated May 16, 2013, U.S. Appl. No. 12/772,261, filed May 3, 2010, 16 pages.

Notice of Allowance dated Sep. 18, 2013, U.S. Appl. No. 12/772,261, filed May 3, 2010, 10 pages.

* cited by examiner

| | 502 | 504 | 506 | 508 |
|---|---|---|---|---|
| | MAC | C-VLAN | S-VLAN | SP |
| | RG MAC | 3071 | 4 | SP1 |
| | RG MAC | 3071 | 2 | SP1 |
| | RG MAC | 17 | 1010 | SP2 |

500

MULTIPLE PREFIX CONNECTIONS WITH TRANSLATED VIRTUAL LOCAL AREA NETWORK

CROSS-REFERENCE TO RELATED APPLICATIONS

This application is a continuation of U.S. patent application Ser. No. 12/772,261 filed May 3, 2010 by John Kaippallimalil and entitled "Multiple Prefix Connections with Translated Virtual Local Area Network", which claims priority to U.S. Provisional Patent Application No. 61/178,107 filed May 14, 2009 by John Kaippallimalil and entitled "System and Method for Supporting Multiple Prefix Connections with User Defined Virtual Local Area Networks (VLANs) in a Communications System", both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some networks, a residential gateway (RG) or a host (e.g. a subscriber) can be connected to multiple service providers (SPs) via an access node (AN) and over a shared interface or access line, such as an active line access (ALA). Each service provider can provide one or multiple services to the host via the shared interface or access line. Typically, the services are routed between the host and the appropriate SPs by the AN over the access line based on a plurality of source Internet Protocol (IP) addresses or prefixes that can be obtained from the SPs. As such, the AN may need to process the service packets to obtain the IP addresses or prefixes from the packets' headers. However, the AN cannot use the IP addresses or prefixes to send router solicitation (RS) messages, Dynamic Host Configuration Protocol (DHCP) messages, or other messages from the host that are sent prior to obtaining the IP addresses or prefixes from the SPs.

SUMMARY

In one embodiment, the disclosure includes a system comprising an AN coupled to a plurality of SPs and a host and configured to forward a plurality of services between the SPs and the host using a plurality of first connections between the AN and the host and a plurality of second connections between the AN and the SPs, and a RG positioned between the host and the AN and coupled to the AN via an access line that comprises the first connections, wherein the AN translates a plurality of first identifiers for the first connections to a plurality of second identifiers for the second connections to route the services appropriately between the host and the SPs over the first connections and the corresponding second connections.

In another embodiment, the disclosure includes a network component comprising at least one processor configured to implement a method comprising receiving a packet for a service on a connection between a subscriber and a SP, replacing a Virtual Local Area Network (VLAN) tag for the subscriber in the packet with a Customer VLAN (C-VLAN)/Service VLAN (S-VLAN) tag for the subscriber and the SP that matches a Media Access Control (MAC) address for a RG in the packet if the packet is received from the RG, and replacing a C-VLAN/S-VLAN tag for the subscriber and the SP in the packet with a VLAN tag for the subscriber that matches the MAC address for the RG in the packet if the packet is received from the SP.

In yet another embodiment, the disclosure includes a method comprising receiving from a host an authentication request for a VLAN connection to the host, receiving a C-VLAN/S-VLAN label for the host and a SP upon authentication of the VLAN, and associating the VLAN and the C-VLAN/S-VLAN label with a MAC address of a RG between the host and the SP.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for identifying a plurality of connections over a shared access line (e.g. ALA) between a RG or a host, such as a subscriber, and a plurality SPs. The connections may correspond to a plurality of services that may be provided to a plurality of hosts or subscribers coupled to the RG, by a plurality of SPs. Each SP may provide one or multiple services to the host, which may be routed or forwarded by an AN via the access line. The services may be forwarded by identifying each connection, e.g. between a host and a SP, and hence sending each service over the corresponding connection. Each service connection between the RG and the AN may be identified using a MAC address for the RG and a VLAN ID that identifies the subscriber. Each corresponding service connection between the AN and the SP may be identified by the MAC address of the RG, a C-VLAN ID that identifies the subscriber, and a S-VLAN ID that identifies the SP. Such combinations of identifiers may be maintained by the AN. As such, the AN may forward service traffic appropriately between the hosts and the SPs over the corresponding connections by translating the MAC address and VLAN ID to the corresponding MAC address, and corresponding C-VLAN ID and S-VLAN ID, and vice-versa. The VLAN identification and translation may be used to route the different services between the hosts and SPs over the access line without the knowledge of or using specified source prefixes or IP addresses and without processing the packets to obtain the prefixes or IP addresses, e.g. in the packets' headers.

Figure 1:
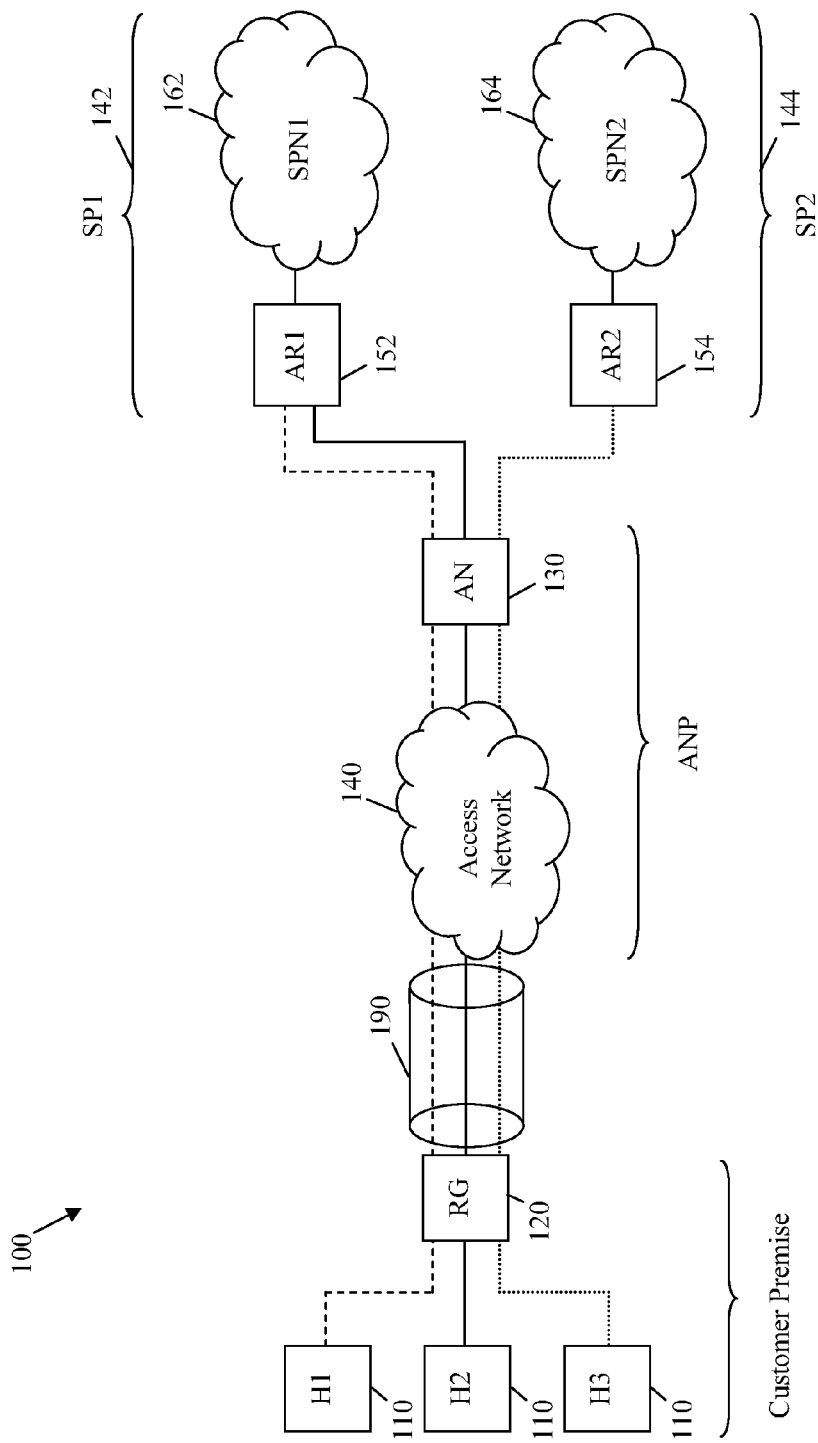
FIG. 1 is a schematic diagram of an embodiment of an access network system.

FIG. 1 illustrates an embodiment of an access network system 100. The access network system 100 may comprise at least one host 110, a RG 120, an AN 130, an access network 140, a first SP (SP1) 142, and a second SP (SP2) 144. Each host 110 may be coupled to the RG 120, for instance at a customer premise or a local network. The AN 130 and the access network 140 may correspond to an access network provider (ANP) and may be coupled to each other and to the RG 120 via an access line 190, as shown in FIG. 1. The AN 130 may also be coupled to each of the first SP 142 and the second SP 144. The first SP 142 may comprise a first access router (AR; AR1) 152 that may be coupled to the AN 130 and a first SP network (SPN; SPN1) 162 that may be coupled to the first AR 152. Similarly, the second SP 144 may comprise a second AR (AR2) 154 that may be coupled to the AN 130 and a second SPN (SPN2) 164 that may be coupled to the second AR 154. Although three hosts (e.g. H1, H2, and H3) and two SPs (e.g. SP1 and SP2) are shown in FIG. 1, the access network system 100 may comprise any number of hosts and SPs. Other embodiments of the access network system 100 may comprise a host 110 or a plurality of hosts 110 that may be coupled to the AN 130 without using the RG 120. In other embodiments, a plurality of RGs 120 may be coupled to the AN 130 via a plurality of corresponding access lines 190. However, in all such embodiments, the access line 190 may carry traffic or services between a plurality of SPs and any host 110, e.g. via the RG 120. Further, the different services may be provided to the hosts 110 over the access line 190 via different connections (e.g. VLANs), which is represented by the different line patterns in FIG. 1.

The host 110 may be any user equipment (UE) or device configured for transmitting and/or receiving signals to and from the RG 120, such as electrical or optical signals. In one embodiment, the host 110 may create, send, or receive the signals using a fixed link, such as a wired cable or a fiber optic cable, between the host 110 and the RG 120. The fixed link may implement Ethernet, Asynchronous Transfer Mode (ATM), IP, or any other suitable protocol. The host 110 may be a fixed device, including a personal computer (PC) such as a desktop computer, a telephone such as a voice over IP (VoIP) telephone, or a set top box. Alternatively, the host 110 may be a portable device, such as a laptop computer, or a cordless phone, which may use the fixed link to communicate with the RG 120. In another embodiment, the host 110 may be any user mobile device, component, or apparatus that communicates with the RG 120 using a wireless link. For example, the host 110 may be a mobile phone, a personal digital assistant (PDA), a portable computer, or any other wireless device. As such, the host 110 may comprise an infrared port, a BLUETOOTH interface, an Institute of Electrical and Electronics Engineers (IEEE) 802.11 compliant wireless interface, or any other wireless communication system that enables the host 110 to communicate wirelessly with the RG 120. Accordingly, the wireless link may be an IEEE 802.11 link, a Wi-Fi link, a BLUETOOTH link, a Worldwide Interoperability for Microwave Access (WiMAX) link, a near field communication (NFC) link, an Infrared Data Association (IrDa) link, or any other communication link established using wireless technology.

The RG 120 may be any device or component configured to allow the host 110 to gain access to the access network 140 associated with the AN 130. For instance, the RG 120 may be configured to establish a wireless or fixed link with the host 110 and forward communications between the host 110 and the AN 130. For example, the RG 120 may be an IP router, such as a customer premises equipment (CPE) router or any router equipment located at a subscriber's premises and that communicates with the access network. Alternatively, the RG 120 may comprise a digital subscriber line (DSL) modem, a cable modem, or a set-top box. In yet another embodiment, the RG 120 may be a node that forwards IPv4 and/or IPv6 packets to and from the host 110. Further, the RG 120 may be a routed RG, which may establish authentication with the access network and allow a trusted host 110 to communicate with the access network.

The AN 130 may be any device that transports communications between the RG 120 and the first SP 142 and between the RG 120 and the second SP 144. For example, the AN 130 may be a switch, a router, or a bridge, such as a Provider Edge Bridge (PEB) or a Provider Core Bridge (PCB). The AN 130 may be coupled to each of the first SP 142 and the second SP 144 via fixed links, such as Ethernet or IP links. The AN 130 may receive different service traffic from the first SPN 162 via the first AR 152, the second SPN 164 via the second AR 154, or both and forward the different service traffic to the RG 120 via the access network 140. The AN 130 may receive/send the different service traffic from/to the first SP 142 and the second SP 144 via different connections, which may include a C-VLAN, a priority tagged VLAN, an S-VLAN, or combinations thereof. The different service traffic may also be forwarded between the AN 130 and the RG 120 using different virtual connections, such as different VLANs, over the shared access line 190. The access line 190 may be a fixed link between the AN 130 and the RG 120, such as a wired cable or a fiber optic cable. The different service connections on both sides of the AN 130 are represented by the different line patterns in FIG. 1.

The first SPN 142 and the second SPN 144 may comprise different or similar SPs, such as an Internet service provider (ISP), a network service provider (NSP), an application service provider (ASP), or combinations thereof. The first SPN 162 and the second SPN 164 may each provide at least one service to the host 110 via the first AR 152 and the second AR 154, respectively. For example, the first SPN 162 and/or the second SPN 164 may provide IP Television (TV) services, which may be streamed down to the hosts 110 over the access line 190.

The first AR 152 and the second AR 154 may be any device that forwards packets between the AN 130 and each of the first SPN 162 and the second SPN 164, respectively. The packets may be forwarded between the AN 130 and each of the first SPN 162 and the second SPN 164 using fixed links. For example, the first AR 152, and similarly the second AR 154, may comprise any of a Broadband Routed Access Servers (BRAS), a Cable Modem Termination Server (CMTS), a router, or combinations thereof. For instance, the first AR 152 and/or the second AR 154 may comprise a Backbone Edge Bridge (BEB), a PEB, a PCB, or a user network interfaces (UNI). In some embodiments, the first AR 152 or the second AR 154 may be a point-oriented wire-line node, such as a DSL connection or a provider network edge device.

In some embodiments, the first AR 152 and the second AR 154 may also provide a plurality of network access services to the host 110 at the customer premise. For instance, the first AR 152 and/or the second AR 154 may exchange authentication information with the access network using the IEEE 802.1X protocol and with an authentication server, such as an authentication, authorization, and accounting (AAA) server to authenticate the host 110 or the RG 120. The authentication information may be exchanged using a remote authentication protocol, such as a Remote Authentication Dial In User Service (RADIUS) protocol or a Diameter protocol. Further, the first AR 152 and/or the second AR 154 may provide quality of service (QoS) requirements for downstream communications with the hosts 110.

In an embodiment, the different services communicated over the different connections between the RG 120 and the AN 130 may be identified by associating the MAC address of the RG 120 with the VLAN IDs for the different hosts 110 or subscribers per host 110. Since the MAC address identifies the RG 120 and the VLAN IDs identify the individual subscribers, the combinations of MAC address and VLAN IDs may be used to identify the individual services and connections for the different hosts 110. In some embodiments, the hosts' prefixes or addresses (e.g. IP prefixes or addresses) may also be combined with the RG MAC address and corresponding VLAN IDs to identify and distinguish the different services over the different connections to the hosts 110. The AN 130 may maintain the RG MAC address, the VLAN IDs, and optionally the prefixes in a VLAN identification list or table. The AN 130 may also associate the RG MAC address and the VLAN IDs with a port or interface for the access line 190, e.g. for each RG 120 coupled to the AN 130. For instance, the AN 130 may maintain the MAC address for each RG 120, the VLAN IDs, and the port ID in a VLAN association list or table.

Additionally, the different services may be associated with the corresponding subscribers and SPs, e.g. the first SP 142 and the second SP 144, using a plurality of C-VLAN IDs that correspond to the subscribers and S-VLAN IDs that correspond to the SPs. The C-VLAN ID and S-VLAN ID pairs may also be associated with the RG MAC address. The AN 130 may maintain the RG MAC address, the C-VLAN IDs, and the S-VLAN IDs in a VLAN translation list or table. The AN 130 may use the association between the RG MAC address, the C-VLAN IDs, and the S-VLAN IDs to properly route the services that correspond to the hosts 110 to and from the SPs. Specifically, the AN 130 may translate the RG MAC address and VLAN IDs in the packets received from the RG 120 over the access line 190 into the RG MAC address and corresponding C-VLAN ID and S-VLAN ID pairs, and thus forward the packets to the corresponding SPs over the appropriate links. Similarly, the AN 130 may translate the RG MAC address and C-VLAN ID/S-VLAN ID in the packets received from the SPs (e.g. in Q-in-Q labels in the packets) into the RG MAC address and corresponding VLAN ID, and thus forward the packets to the RG 120 over the access line 190. The RG 120 may send the packets received from the AN 130 over the access line 190 based on the RG MAC address and VLAN ID.

The AN 120 may use such VLAN identification and translation scheme to route service related traffic, such as solicitation messages and/or DHCP requests, over the access line 190 without the knowledge of host IP addresses or prefixes, e.g. before the SPs assign the IP addresses or prefixes to the hosts 110. The VLAN identification and translation scheme may also be used to route service messages, e.g. DHCP or IPv6 Neighbor Discovery messages, using unspecified IP addresses or prefixes. For instance, the services may be forwarded over the corresponding connections without the need to process the IP addresses or prefixes, e.g. in the service packets' headers. As such, the VLAN identification and translation scheme may be implemented at the network link layer, e.g. using Ethernet protocols, which may improve transfer efficiency, reduce processing complexity, or both.

In an embodiment, the RG 120 and/or the host 110 may initially send an authentication request for a new VLAN connection for each of the first SP 142 and the second SP 144. When the AN 130 receives on its port an authentication request for a new VLAN connection from the RG 120 or the host 110, the AN 130 may initiate an AAA authentication sequence or any other authentication sequence to authenticate the host 110. The authentication request may be received on the port coupled to the access line 190 between the RG 120 and the AN 130. After authentication is completed, the RG 120 and/or the host 110 may establish a VLAN connection for each of the first SP 142 and the second 144 to receive the services. The host 110 may be configured to send/receive the service packets using the authenticated VLAN connection or a second VLAN, e.g. between the host 110 and the RG 120. In another embodiment, the VLAN connections may be configured before initiating the service sessions, where the RG 120 may be configured to use a plurality of VLANs or C-VLANs for each SP to obtain services from that SP. Additionally, the RG 120 or the host 110 may obtain a prefix using a RS/routing acknowledgement (RA) sequence, an address using DHCP, or a delegated prefix for each host 110. Alternatively, the RG 120 may obtain a delegated prefix but not the host 110, e.g. as specified in Internet Engineering Task Force (IETF) Request for Comments (RFC) 3633. The prefix, address, or delegated prefix may be associated with the corresponding VLAN connection, e.g. in the VLAN identification list.

Upon provisioning or configuring the VLAN connection, the AN 130 may store the RG MAC address, the VLAN ID for the subscriber, and an access interface or port ID, e.g. in the VLAN association list. The AN 130 may also store the authentication lifetime for the subscriber and any other information about the RG 120 and/or the host 110. Additionally, the AN 130 may obtain from the AAA entity (or an authentication server) a C-VLAN/S-VLAN pair for each indicated VLAN in the authentication signal and store it with the corresponding VLAN, e.g. in the VLAN translation list. Alternatively, the C-VLAN/S-VLAN pair may be configured statically for each VLAN.

Figure 2:
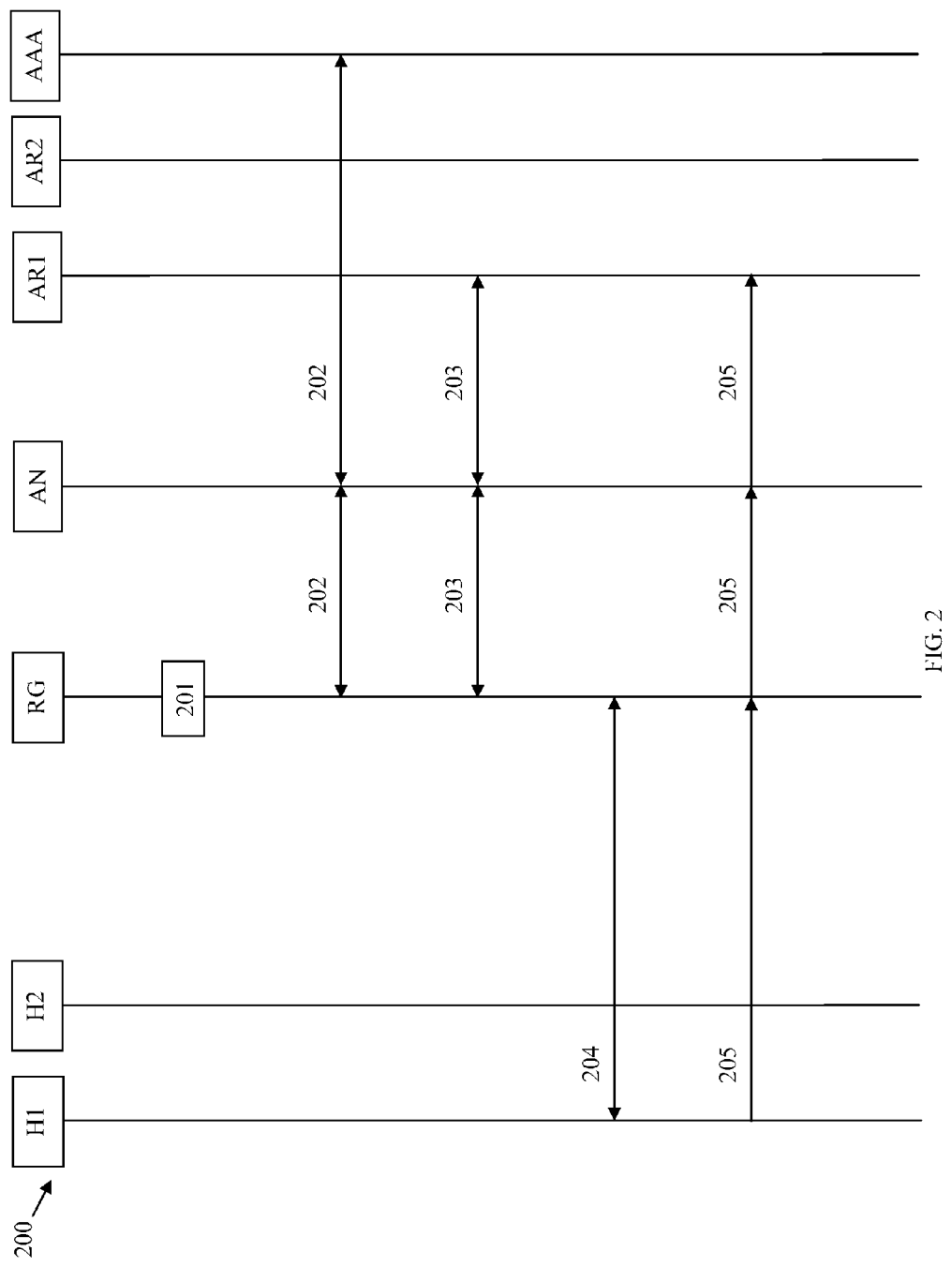
FIG. 2 is a protocol diagram of an embodiment of a VLAN registration method.

FIG. 2 illustrates an embodiment of a VLAN registration method 200, which may enable an AN to route different services for a plurality of SPs between the SPs and a RG or a host over an access line. For example, the VLAN registration method 200 may be implemented, e.g. by the AN 130 and/or the RG 120, to properly forward the different service traffic between the hosts 110 and any of the first SP 142 and the second SP 144 over the appropriate connections and the channel 190. At step 201, the RG and/or host may boot up and establish a VLAN connection for any SP (e.g. VLAN 1 for SP1 or VLAN 2 for SP2), for instance based on configuration information by the network or the operator.

At step 202, the RG may authenticate the VLAN connection with a corresponding SP via the AN and the AR of the SP, e.g. AR1 for SP1 or AR2 for SP2. Accordingly, the RG may send to the AN a IEEE 802.1X, protocol for carrying authentication for network access (PANA), or other authentication signal with a network access identifier (NAI) that includes a suffix with the domain name of the service provider (SP). The AN may receive the authentication signals for the VLANs for a plurality of SPs and store the associations between the VLANs and the SPs. For example, the AN may associate VLAN 1 with SP1 and VLAN2 with SP2 and register the corresponding entries in the VLAN association list. The AN may then request from an AAA server or other authentication entity (not shown) to authenticate the RG or host. In reply, the AAA may authenticate the RG or host and send back an authentication status "success" to the AN. The AAA server may also provide the AN a C-VLAN/S-VLAN pair, e.g. as a VLAN Q-in-Q label, for the authenticated VLAN, which may be stored at the AN. The AN may then forward the authentication status "success" to the RG over the corresponding VLAN.

At step 203, the RG may initiate a RS/RA exchange via the AN with the AR that corresponds to the SP, e.g. after configuring the link-local address. The RS/RA request may be initiated to obtain router information, such as an advertised prefix, an authentication lifetime, and/or other information. The RS/RA exchange messages may indicate the corresponding VLAN, e.g. VLAN 1 for SP1, but may not specify a source IP address or may comprise an unspecified IP address. Alternatively, the RG may be a requesting router, e.g. according to RFC 3633, that sends to the AR a DHCP request to obtain an Identity Association for Prefix Delegation (IA PD). If the RG does not have an IP address, the DHCP request may be sent with an unspecified IP address and the corresponding VLAN ID, e.g. VLAN 1 for AR1 and SP1.

At step 204, the host associated with the VLAN connection, e.g. H1, may initiate a RS/RA message sequence with the RG to request an IP prefix or address. The RG may determine which pool of delegated prefixes to use to provide an IP prefix (e.g. IPv6 prefix) to the host based on static configuration and/or policies. The RG may send then IP prefix to the host and associate the corresponding VLAN, e.g. VLAN 1 for H1, to the SP.

At step 205, the RG and the AN may forward the service packets using the VLAN connection, e.g. VLAN 1, between the corresponding host and AR, e.g. H1 and AR1. The AR may translate the VLAN in the packets by substituting the VLAN in the packet header with a corresponding Q-in-Q label (e.g. C-VLAN/S-VLAN pair) when the packet is sent from the host to the SP. The AN may also substitute the Q-in-Q label in the packet header with a corresponding VLAN ID when the packet is sent from the SP to the host.

Figure 3:
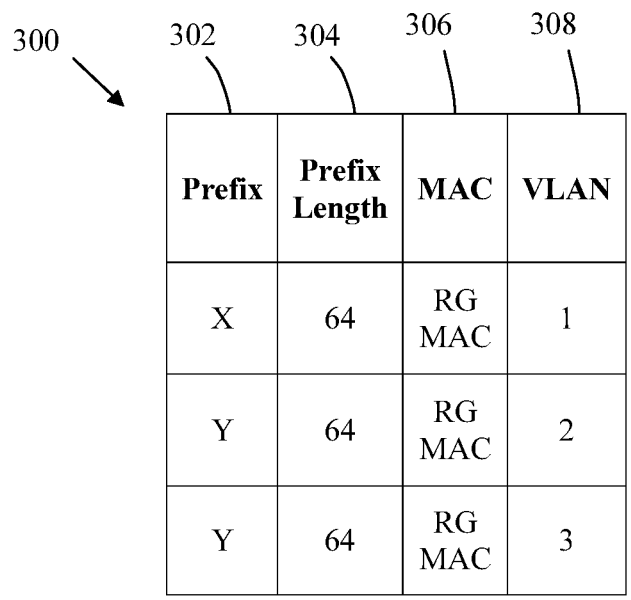
FIG. 3 is a schematic diagram of an embodiment of a VLAN identification list.

FIG. 3 illustrates an embodiment of a VLAN identification list 300, which may be used to identify the RG MAC address with the VLAN connections to each subscriber and the host prefixes, for instance at the AN. The RG MAC address in the VLAN identification list 300 may be associated with each host prefix and a VLAN for each subscriber. For instance, the VLAN identification list 300 may be stored at the AN in the form of a table, which may comprise a host prefix column 302, a RG MAC address column 306, and a VLAN column 308. The host prefix column 302 may comprise the individual prefixes assigned to the different hosts. The RG MAC address column 306 may comprise the MAC address of a RG coupled to the AN. The VLAN column 308 may comprise the VLAN ID for each connection to a host or subscriber. Additionally, the VLAN identification list 300 may comprise a prefix length column 304 that indicates the length of each assigned prefix, e.g. in bits. For example, the prefix length may be equal to about 64 bits in the case of IPv6 assigned prefixes or about 32 bits for IPv4 assigned prefixes.

Figure 4:
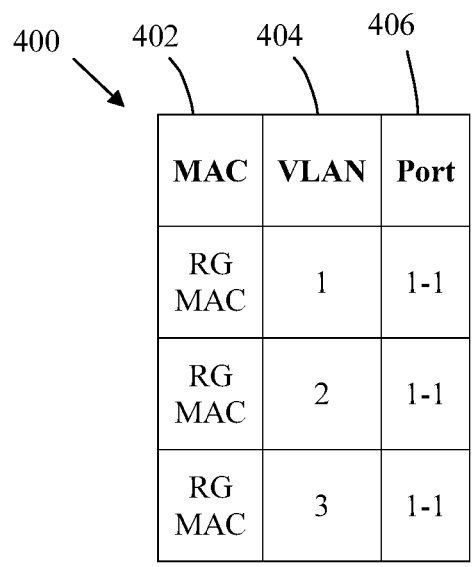
FIG. 4 is a schematic diagram of an embodiment of a VLAN association list.

The VLAN association list and the VLAN translation list together may make up the mapping from RG-AN segment to AN-SP segment. FIG. 4 illustrates an embodiment of a VLAN association list 400, which may be used to associate the RG MAC address with the VLAN connections to each subscriber and the access line connection port on the AN. The RG MAC address in the VLAN association list 400 may be associated with the port ID of the access line and a VLAN for each subscriber. For instance, the VLAN association list 400 may be stored at the AN in the form of a table, which may comprise a RG MAC address column 402, a VLAN ID column 404, and a port column 406. The RG MAC address column 402 may comprise the MAC addresses for a RG coupled to the AN. The VLAN column 404 may comprise the VLAN ID for each subscriber or host. The port column 406 may comprise the port ID associated with all the VLANs for the same access line and RG. However, if multiple RGs and corresponding access lines are coupled to the AN, the RG MAC address column 402 may comprise a plurality of RG MAC addresses and the port column 406 may comprise a plurality of port IDs.

Figures 5, 6:
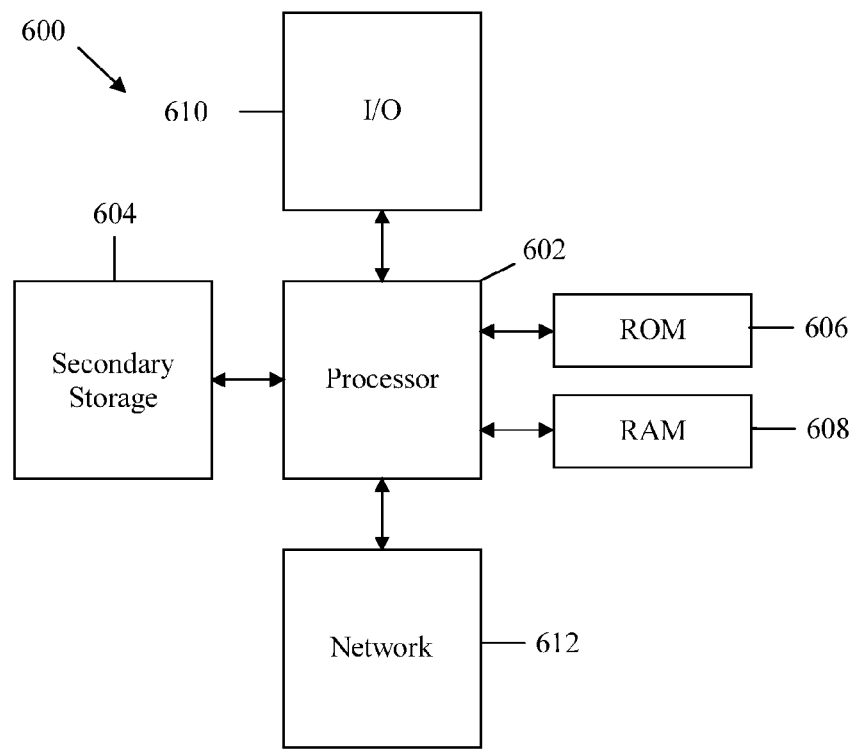
FIG. 5 is a schematic diagram of an embodiment of a VLAN translation list.
FIG. 6 is a schematic diagram of an embodiment of a general-purpose computer system.

FIG. 5 illustrates an embodiment of a VLAN translation list 500, which may be used to translate the VLANs associated with the RG MAC address, e.g. to switch between the VLAN tags that identify the connections between the AN and the RG over the access line and the C-VLAN/S-VLAN labels that identify the connections between the AN and the different SPs. The RG MAC address in the VLAN translation list 500 may be associated with a C-VLAN for each subscriber or host, a S-VLAN for each SP, and optionally a SP ID or domain name, which may be stored at the AN in the form of a table. As such, the VLAN translation list 500 may comprise a RG MAC address column 502, a C-VLAN column 504, a S-VLAN column 506, and optionally a SP column 508. The RG MAC address column 502 may comprise the MAC address of the RG. The C-VLAN column 504 may comprise the C-VLAN ID for each subscriber or host. The S-VLAN column 506 may comprise the S-VLAN ID for each SP. Similarly, the SP column 508 may comprise a SP ID or domain name for each SP. The AN may use the C-VLAN/S-VLAN associations with the RG MAC address in the VLAN translation list 500 and the VLAN associations with the same RG MAC address in the VLAN association list 400 to translate the VLANs between the hosts and the SPs.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.6, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An access node (AN) coupled to a plurality of service providers (SPs) and a plurality of hosts, comprising: a processor operably coupled to a memory storing instructions which when executed by the processor perform the following:
   forward a plurality of services between the SPs and the hosts using a plurality of first connections between the AN and the hosts and a plurality of second connections between the AN and the SPs, wherein the services are forwarded via a residential gateway (RG) positioned between the hosts and the AN, and wherein the AN is coupled to the RG via an access line that comprises the first connections;
   translate a plurality of first identifiers for the first connections to a plurality of second identifiers for the second connections to route the services between the hosts and the SPs over the first connections and the corresponding second connections,
   wherein each of the first identifiers comprises a Media Access Control (MAC) address for the RG, a Virtual Local Area Network (VLAN) identifier (ID) that corresponds to one of the hosts, and a host prefix that identifies the host corresponding to the VLAN ID,
   wherein the first identifiers are maintained in a first list at the AN,
   wherein each of the second identifiers comprises the MAC address for the RG, a Customer VLAN (C-VLAN) ID that corresponds to one of the hosts, and a Service VLAN (S-VLAN) ID that corresponds to one of the SPs, and
   wherein the second identifiers are maintained in a second list at the AN.

2. The AN of claim 1, wherein each VLAN ID for each host in the first list is mapped to a C-VLAN ID and S-VLAN ID pair in the second list.

3. The AN of claim 1, wherein the MAC address for the RG and each VLAN ID that corresponds to one of the hosts in the first list is associated with a port ID that corresponds to the access line in a third list that is maintained at the AN.

4. The AN of claim 3, wherein the first identifiers comprise a plurality of MAC addresses for a plurality of RGs, and wherein the second identifiers comprise the same MAC addresses.

5. The AN of claim 4, wherein each VLAN ID for each host that is associated with one of the MAC addresses for the RGs in the first list is mapped to a C-VLAN ID and S-VLAN ID pair that corresponds to the same RG MAC address in the second list.

6. The AN of claim 5, wherein the third list comprises a plurality of port IDs for a plurality of access lines that correspond to the RGs.

* * * * *